US011615172B1

(12) United States Patent
Huggar et al.

(10) Patent No.: US 11,615,172 B1
(45) Date of Patent: Mar. 28, 2023

(54) SIGNATURE VERIFICATION AND AUTHENTICATION SYSTEM

(71) Applicant: UIPCO, LLC, San Antonio, TX (US)

(72) Inventors: Stacy Callaway Huggar, San Antonio, TX (US); Ryan Thomas Russell, San Antonio, TX (US); Ashley Raine Philbrick, San Antonio, TX (US); Carlos J P Chavez, San Antonio, TX (US); Quian Antony Jones, San Antonio, TX (US); Janelle Denice Dziuk, Falls City, TX (US); Sumita T. Jonak, San Antonio, TX (US); Yevgeniy Viatcheslavovich Khmelev, San Antonio, TX (US)

(73) Assignee: United Services Autmobile Association (USAA), San Antonio, TX (US)

( * ) Notice: Subject to any disclaimer, the term of this patent is extended or adjusted under 35 U.S.C. 154(b) by 359 days.

(21) Appl. No.: 16/708,585

(22) Filed: Dec. 10, 2019

Related U.S. Application Data

(60) Provisional application No. 62/812,395, filed on Mar. 1, 2019.

(51) Int. Cl.
| | |
|---|---|
| *G06F 21/31* | (2013.01) |
| *G06F 3/0488* | (2022.01) |
| *G06F 21/45* | (2013.01) |
| *H04L 67/306* | (2022.01) |
| *G06F 3/0354* | (2013.01) |

(52) U.S. Cl.
CPC .......... *G06F 21/316* (2013.01); *G06F 3/0488* (2013.01); *G06F 21/45* (2013.01); *H04L 67/306* (2013.01); *G06F 3/03545* (2013.01)

(58) Field of Classification Search
CPC ...... G06F 21/316; G06F 3/0488; G06F 21/45; G06F 3/03545; H04L 67/306
See application file for complete search history.

(56) References Cited

U.S. PATENT DOCUMENTS

| | | | |
|---|---|---|---|
| 7,620,244 B1 * | 11/2009 | Collier | G06V 40/382 382/119 |
| 2014/0010420 A1 * | 1/2014 | Huteaux | G06V 40/37 382/119 |
| 2014/0038558 A1 * | 2/2014 | Kim | H04W 12/08 455/411 |
| 2015/0071505 A1 * | 3/2015 | Kim | G06F 3/04883 382/119 |
| 2016/0283777 A1 * | 9/2016 | Holden | G06K 9/00181 |
| 2018/0285625 A1 * | 10/2018 | Danyluk | G06V 40/382 |

\* cited by examiner

*Primary Examiner* — John T Repsher, III
(74) *Attorney, Agent, or Firm* — Plumsea Law Group, LLC

(57) ABSTRACT

A method for authenticating signatures is disclosed. The method includes measuring dynamic properties of the signature as the signature is created. The method includes recording pressure and velocity information as an electronic signature is created on an electronic device. The recorded pressure and velocity information may be compared with stored pressure and velocity information to determine if the signature is authentic.

20 Claims, 11 Drawing Sheets

SIGNATURE VERIFICATION AND AUTHENTICATION SYSTEM

CROSS-REFERENCE TO RELATED APPLICATIONS

This application claims the benefit of the U.S. Provisional Patent Application Ser. No. 62/812,395, filed Mar. 1, 2019, for "Signature Verification and Authentication System," the entirety of which is hereby incorporated by reference.

TECHNICAL FIELD

The present disclosure generally relates to verification and authentication, and in particular, to methods of verifying and authenticating digital signatures.

BACKGROUND

As electronic devices become more popular and business move to paperless systems, electronic signatures are increasingly popular for verifying and/or authenticating transactions. Currently, electronic signature verification relies on examining static features of a signature. Such features of a signature may be easy to duplicate, since a fraudulent actor can simply look at an example of a signature and attempt to duplicate it.

There is a need in the art for a system and method that addresses the shortcomings discussed above.

SUMMARY

In one aspect, a method of authenticating a signature includes recording, at a device, pressure information as the signature is created on a display of the device, retrieving stored pressure information associated with an authenticated signature, and comparing the recorded pressure information for the signature with the stored pressure information to determine if the signature is authentic.

In another aspect, a method of authenticating a signature includes recording, at a device, velocity information as the signature is created on a display of the device, retrieving stored velocity information associated with an authenticated signature, and comparing the recorded velocity information for the signature with the stored velocity information to determine if the recorded signature is authentic.

In another aspect, a method of authenticating a signature includes recording, at a device, pressure information and velocity information as the signature is created on a display of the device, retrieving stored pressure information and stored velocity information associated with an authenticated signature, and comparing the recorded pressure information for the signature with the stored pressure information and comparing the recorded velocity information for the signature with the stored velocity information to determine if the signature is authentic.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The disclosed system and method provides electronic signature verification and authentication. A signature is considered a means of written identification for items such as documents, personal checks or written letters. An electronic signature comprises an electronic version of written identification. Electronic signatures may be used in situations such as in-store credit card purchases or banking transactions.

The system includes the ability to record, store and transmit information of various different features of an electronic signature such as stroke speed, velocity and pressure, and the time to complete the signature. The embodiment may include a database containing stored signature information with a network that allows for communication between the database and associated devices. The stored information comprises of measured signature features that may be compared with potential fraudulent signatures to help increase protection against situations such as identity theft. In contrast to other signature identification techniques that consider only static properties of a signature, the exemplary system and method may provide increased fraud protection due to additional signature features that can be compared between two signatures.

Figure 1:
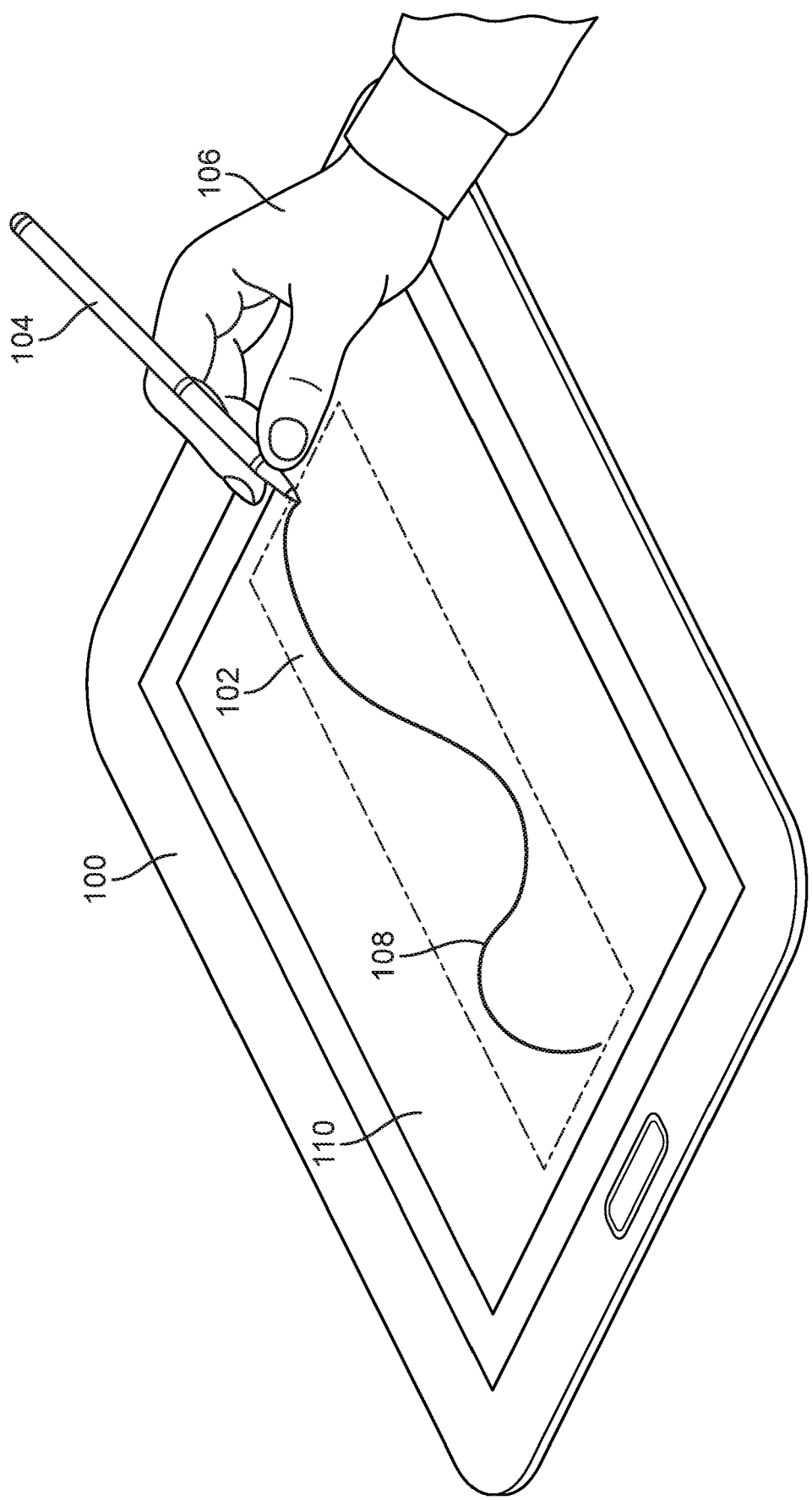
FIG. 1 is a schematic diagram of an embodiment of a signature.

FIG. 1 is a schematic diagram of an embodiment of a signature. For purposes of clarity, the illustrated signature is comprised only of a few simple curves and is not intended to represent an actual name. The embodiment may include one or more devices that allow a user to create an electronic signature. The device shown in FIG. 1 is tablet 100. Exemplary devices include, but are not limited to: cellular phones, smart phones, tablet computers, notebook computers, and e-book readers. Tablet 100 may comprise a processor and memory for storing information, including software information and/or data. Memory may include any type of storage, including Random Access Memory (RAM), micro-SD memory and Solid State Drives (SSD).

In some embodiments, tablet 100 may also include various communication components configured to facilitate communication between Tablet 100 and other devices or computing systems over various kinds of networks. These may include a cellular network component, a Wi-Fi component, a Personal Area Network (PAN) component, and a Near Field Communication (NFC) component. One or more of these components may function as radios within tablet 100 for transmitting and receiving information in a specific radio band. In some embodiments, one or more of these components could be stand-alone hardware elements disposed in tablet 100. In other embodiments, one or more of these components may be integrated components within a System on a Chip (SoC).

Tablet 100 may utilize additional components such as writing instrument 104. As shown in FIG. 1, writing instrument 104 is a stylus pen, which may be held by a user 106. Other examples of writing implements may include a pen, pencil, a soft or hard tip stylus, or a user's finger. Tablet 100 may also include additional various hardware components, such as display 110. In some embodiments, display 110 could be a touch-screen display that provides touch-based input.

In some embodiments, display 110 may include a predetermined signing area 102. Signing area 102 may define an area that may respond to a stimulus, such as physical contact, to produce an electronic signature. In some embodiments, signing area 102 may include the entire area of display 110, but as shown in FIG. 1, signing area 102 is only portion of display 102.

Electronic signature 108 may be created in one or more ways using writing instrument 104. Referring to FIG. 1, tablet 100 can produce the electronic signature 108 when writing instrument 104 makes direct contact with display 110 within signing area 102. In other embodiments, tablet 100 and writing instrument 104 may include components to produce the electronic signature 108 when writing implement 104 is held within a predetermined proximity from display 110 and signing area 102.

Figure 2:
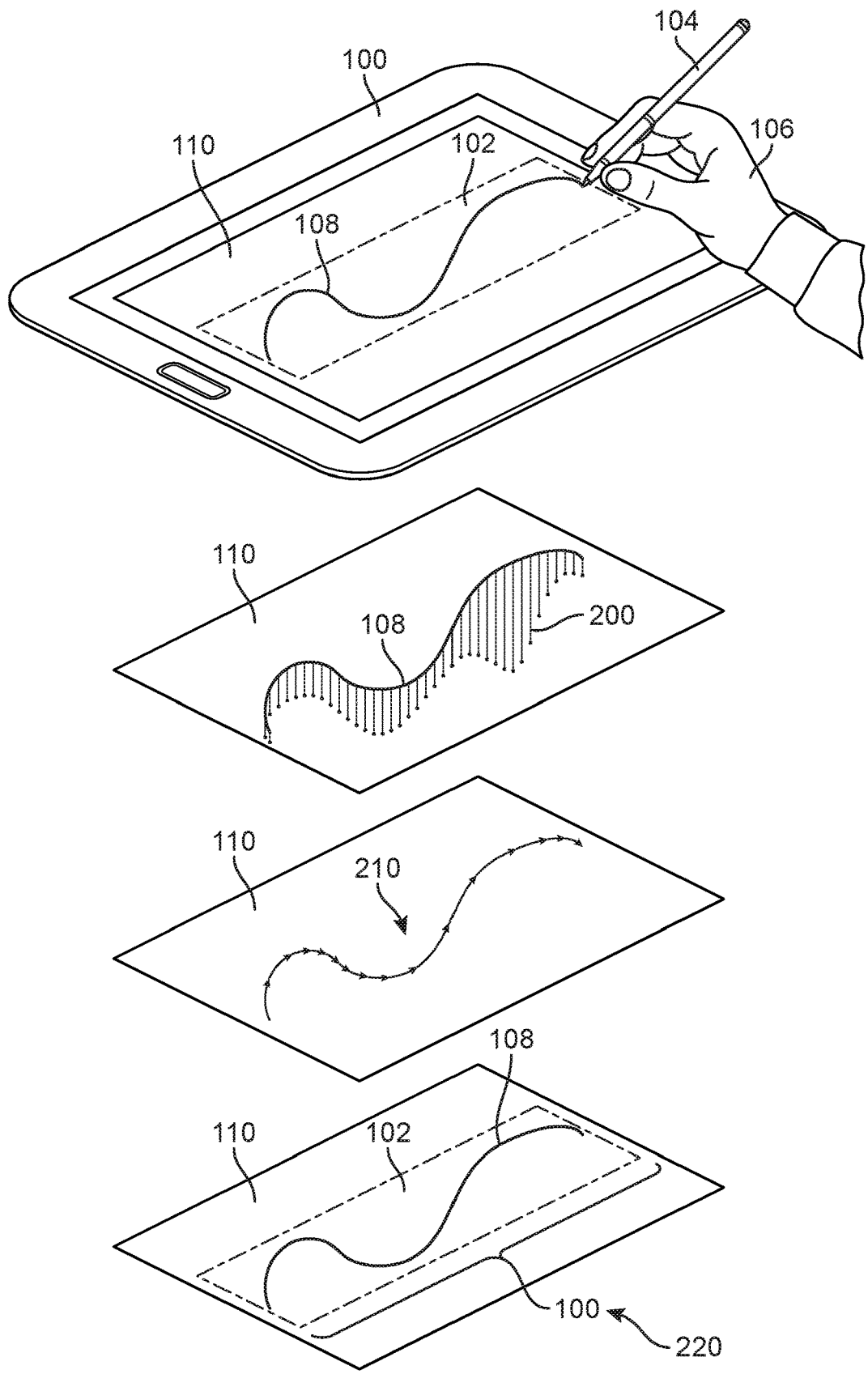
FIG. 2 is a schematic diagram of an embodiment of various authentication measurements of a signature.

FIG. 2 is a schematic diagram of an embodiment of various authentication measurements that may be associated with electronic signature 108. As used herein, the term "authentication measurement" refers to any measurement that can be made while a signature is being created, which may then be used to help authenticate the signature. Examples of authentication measurements can include a pressure profile, a velocity profile and a size profile. Tablet 100 may include components to measure these various characteristics of a user's electronic signature.

In some embodiments, tablet 100 may be configured to measure one or more signature characteristics. As shown in FIG. 2, tablet 100 can measure three characteristics associated with electronic signature 108. The signature characteristics are represented schematically in FIG. 2 as virtual layers of display 110. When tablet 100 records signature 108, details and information associated with pressure, velocity and size of signature 108 may be included in the recorded data. Specifically, these may include pressure lines 200, a velocity line 210, and a unitized size 220 measurement. Each of these features is discussed in further detail below and shown in FIGS. 3-5.

In some embodiments, the system may create multiple signature characteristic profiles based on the writing instrument used to create the signature. For example, signature characteristics for the same signature can vary depending on whether the user is signing with a stylus or a finger. Therefore, in some embodiments, a system could record a first set of signature characteristics associated with using a stylus and a second set of signature characteristics associated with using a finger. When the system detects that a user is signing with a stylus, the first set of signature characteristics may be retrieved to authenticate the signature. When the system detects that a user is signing with their finger, the second set of signature characteristics may be retrieved to authenticate the signature.

The signature characteristics recorded by tablet 100 may be affected in various ways based on the position of tablet 100 when a signature is created. In some embodiments, tablet 100 can be mounted in a fixed position or unmounted where the position of tablet 100 is not fixed. In an unfixed position, tablet 100 may be held in the user's non-signing hand while creating a signature. Different positions of tablet 100 can create different pressure, velocity and size measurements associated with the signature due to a varied angle of tablet 100 and the angle of writing instrument 104 when the signature is created. For example, user 106 may create a signature 108 with different signature characteristic data when tablet 100 is mounted horizontally than if user 106 creates their signature while holding tablet 100 horizontally due to the possible movement created when holding tablet 100. To account for these differences, in some embodiments, a system could store a range of signature characteristics, corresponding to the user's signature in a variety of different situations corresponding to tablet placement and orientation.

Figure 3:
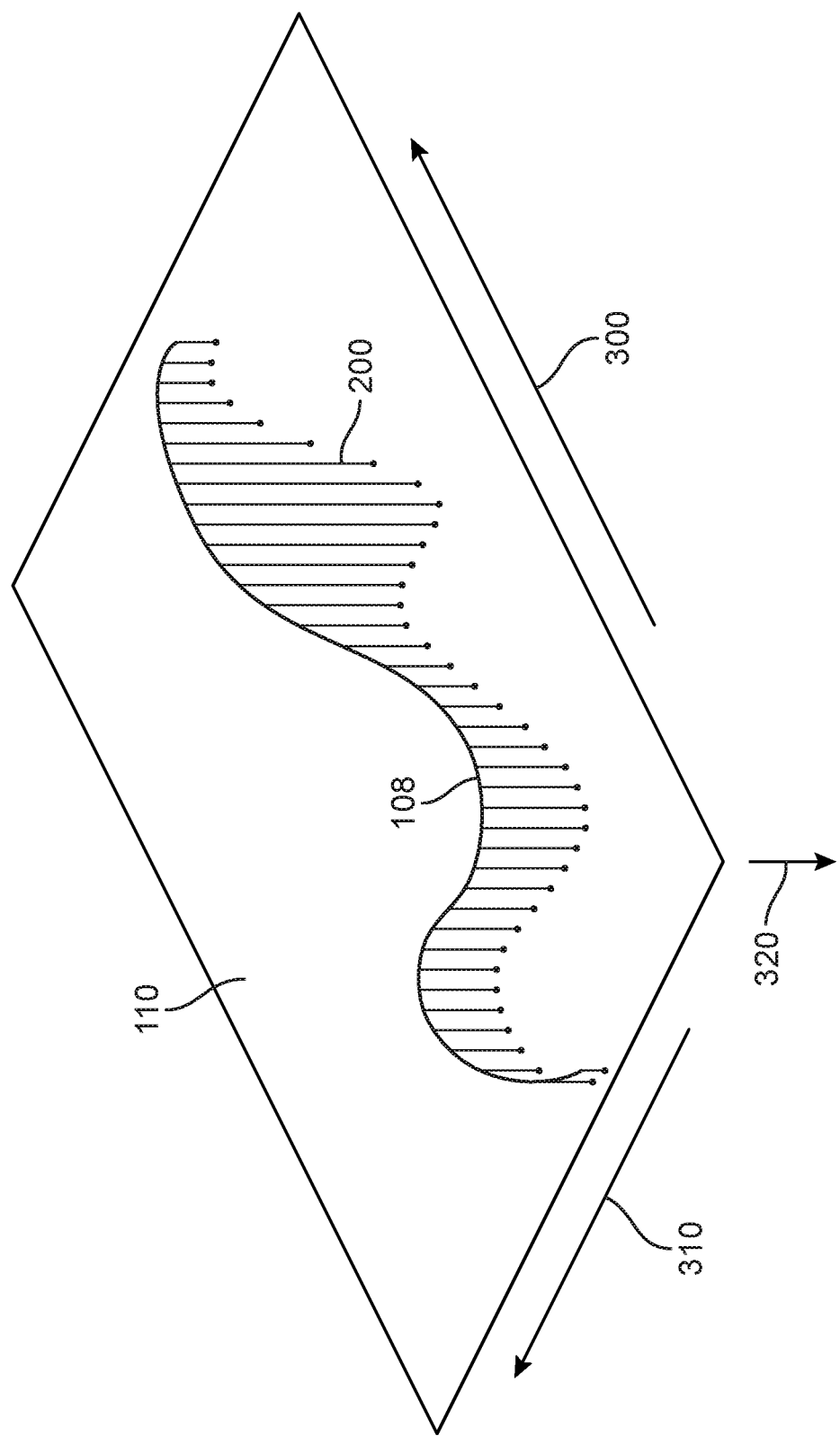
FIG. 3 is a schematic diagram of an embodiment of a pressure map for the signature of FIG. 2.

FIG. 3 is a schematic diagram of an embodiment of a pressure map associated with electronic signature 108. The pressure map can measure the amount of force applied to display 110 when user 106 produces electronic signature 108. In order to visually characterize the amount of pressure applied at each point along signature 108, pressure lines 200 are indicated schematically in FIG. 3. Pressure lines 200 represent the respective force applied to signing area 102 and display 110 from writing instrument 104 at different points along signature 108. The location of each pressure line along signature 108 can be characterized by a first horizontal axis 300 and a second horizontal axis 310.

In embodiments, pressure lines 200 may vary in length during different periods of time while signature 108 is produced. Here, the length of each pressure line is indicated along an axis 320 that is perpendicular to display 110. The length may vary due to changing force applied during signature production. Referring to FIG. 3, pressure lines 200 may appear longer due to more force applied to signing area 102 while shorter pressure lines 200 are due to less force applied to signing area 102.

Figure 4:
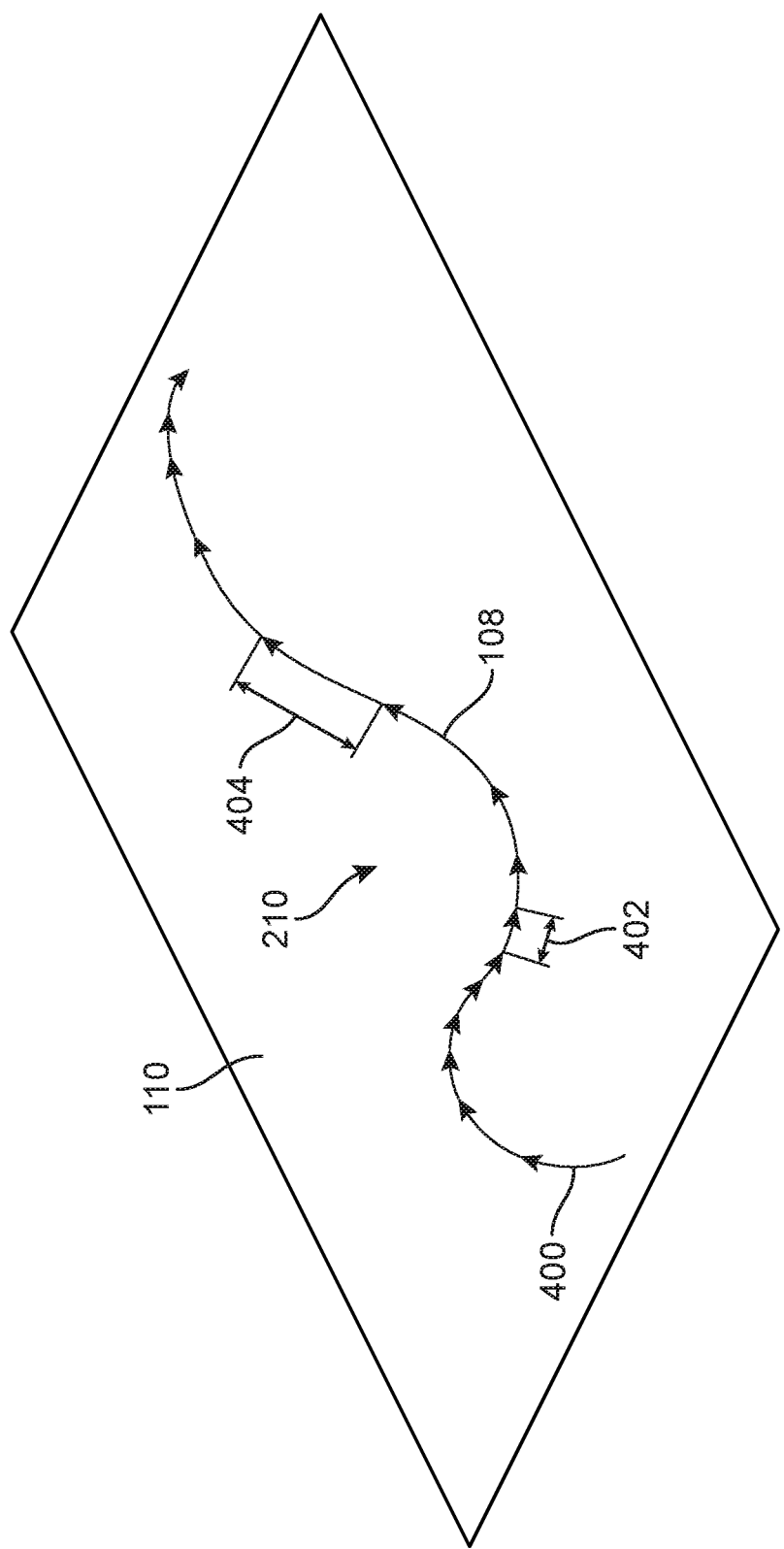
FIG. 4 is a schematic diagram of an embodiment of a velocity map for the signature of FIG. 2.

FIG. 4 is a schematic diagram of an embodiment of a velocity map. In some embodiments, the velocity map can be associated with the velocity profile data that is recorded by tablet 100. As shown in FIG. 4, velocity line 210 is comprised of a sequence of individual vectors 400 that are oriented along signature 108. represents signature 108 as individual vectors 400 that connect from tail to tip. Each vector 400 provides a visual representation for how far writing implement 104 travels in a fixed amount of time. Longer vectors indicate a greater velocity, since this implies that writing implement 104 has traveled a greater distance during some fixed duration. For example, vector 402 has a shorter length than vector 404. This indicates that writing implement 104 traveled slower (along display 110) at the portion of signature 108 where vector 402 is located than it did at the portion of signature 108 where vector 404 is located.

Although a user's signature may generally remain consistent in form, the relative size of the signature may change, for example, depending on the size of the display or signing area on a device. In order to make comparisons between signatures of different sizes, each signature may be associated with a unitized size. As used herein, the term "unitized size" refers to a unit of size that may be defined relative to some measurable parameter of a signature (such as its overall length or overall height). Then other measurements may be made relative to this unit of size to yield a dimensionless parameter. For example, if a signature has an overall length L1, this may be defined as a unit size (or unit length), so that all other measurements associated with features of the signature are made relative to this unit size. If the height of the signature has a value of half the length (i.e., half of L1) then it may be defined has having a height equal to half of the unit size. Thus, when comparing measurements between two different signatures, the comparisons may be made between the unitized sizes of the length, width, or other measurements, since it is the relative shape and sizes of features in the signature that matter more so than the absolute shape and size.

Figure 5:
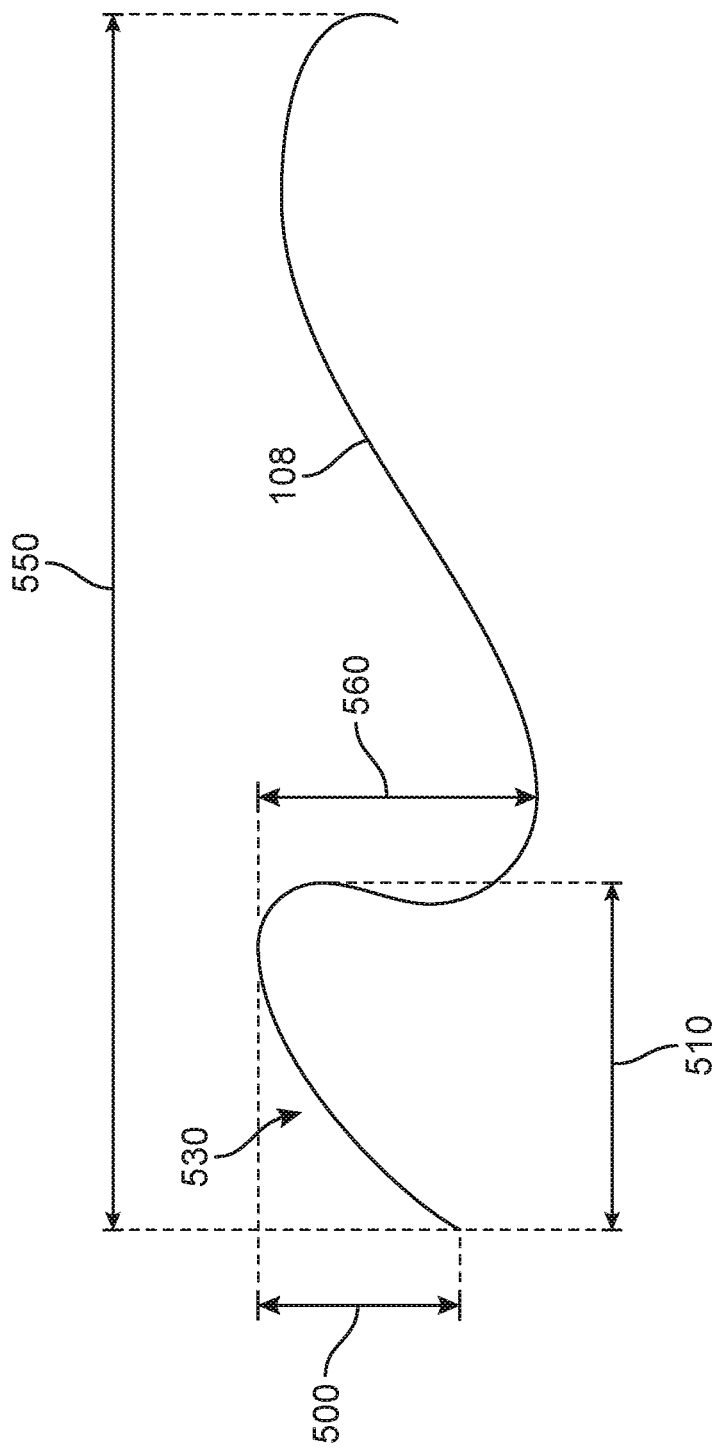
FIG. 5 is a schematic diagram of an embodiment that measures length and height of an exemplary signature.

In FIG. 5, various measurements of segments or portions of signature 108 are depicted. In the exemplary embodiment, signature 108 may be seen to have an overall length 550 and an overall height 560. In some cases, overall length 550 or overall height 560 could be used to determine the unitized size. Then all other measurements may be made relative to this unitized size. For example, if overall length 550 is used as a unitized size for signature 108, then first length 510 of a forward curved portion 530 of signature 108 could be measured as a fraction of overall length 550. For example, if first length 510 has a value that is approximately ⅓ of overall length 550, first length 510 may be given as a dimensionless value of approximately ⅓. Other measurements could also be made in relative (i.e., dimensionless) units defined by the overall length. For example, a first height 500 of forward curved portion 530 could be provided as a fraction of the overall length 550. Alternatively, the overall height 560 could be used as the unitized size, so that first height 500 is given as a fraction of overall height 560. In still other embodiments, other suitable measurements could serve as the unitized size.

Using dimensionless sizes allows for comparisons between signatures of different sizes. Specifically, not only can relative lengths, heights, and other distances be compared, but also relative velocities. Thus, the velocity profile of two different signatures of different sizes can still be compared by using values for the velocity that are given by changes in unitized distance over a fixed duration of time.

In some embodiments, the signature measurements collected by the system may recognize which hand a user signs with. For example, it may be more likely that a left handed signature begins from the top of signing area 102, whereas a right handed signature may be more likely to begin from the bottom of signing area 102. In some embodiments, the system can sense biases in pressure, including the angle of pressure and starting point of the signature. These pressure biases can be used to determine the signing hand of the user. In other embodiments, a system could sense the palm of the user's hand. To enable this feature, the system may need to temporarily override any palm rejection settings. The system may then infer if the user is writing with a left or right hand based on the relative positions of the palm and the writing instrument (or finger).

In other embodiments, display 110 and signing area 102 may detect the users signing hand. While creating a signature, a user may move their hand across display 110 and signing area 102 with respect to the direction and magnitude of the signature. The system may be able to detect which hand the user signs with based on the information recorded associated with the hand position and direction when the signature is created.

Figure 6:
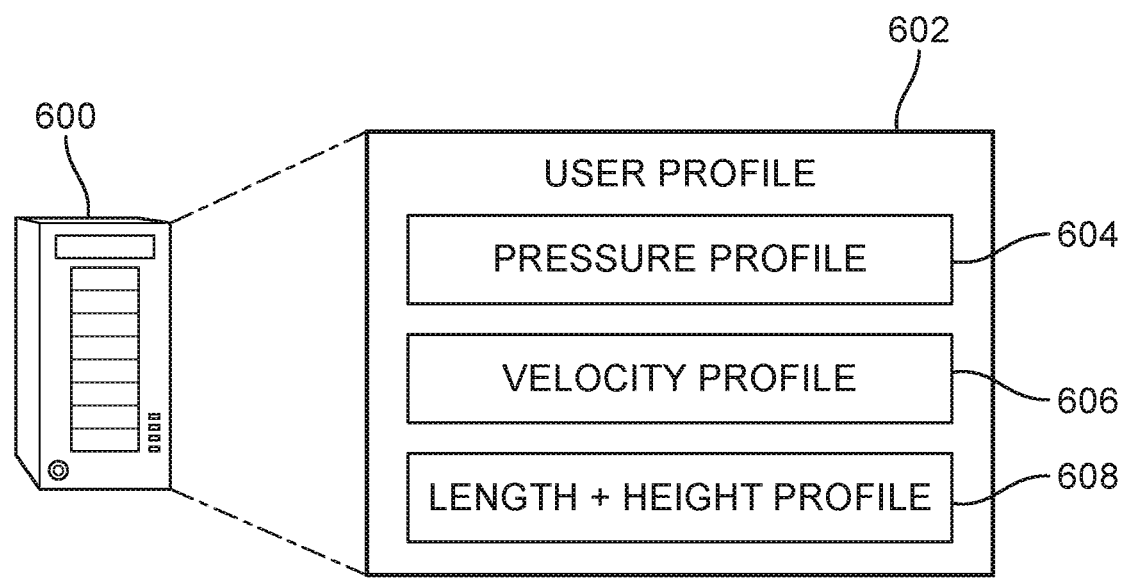
FIG. 6 is a schematic view of an embodiment of multiple profiles stored in a database.

FIG. 6 is a schematic view of an embodiment of multiple profiles stored in server 600. Server 600 can represent one or more servers that include components for communication, processing, storage and retrieval of data. In embodiments, server 600 may store the recorded data from tablet 100 that is associated with signature 108. The data information stored may be represented by a user profile 602. User profile 602 may include the recorded data comprised of authentication measurements associated with signature 108 of user 106. Specifically, the data may include the recordings of pressure profile 604, velocity profile 606 and length and height profile 608.

Figure 7:
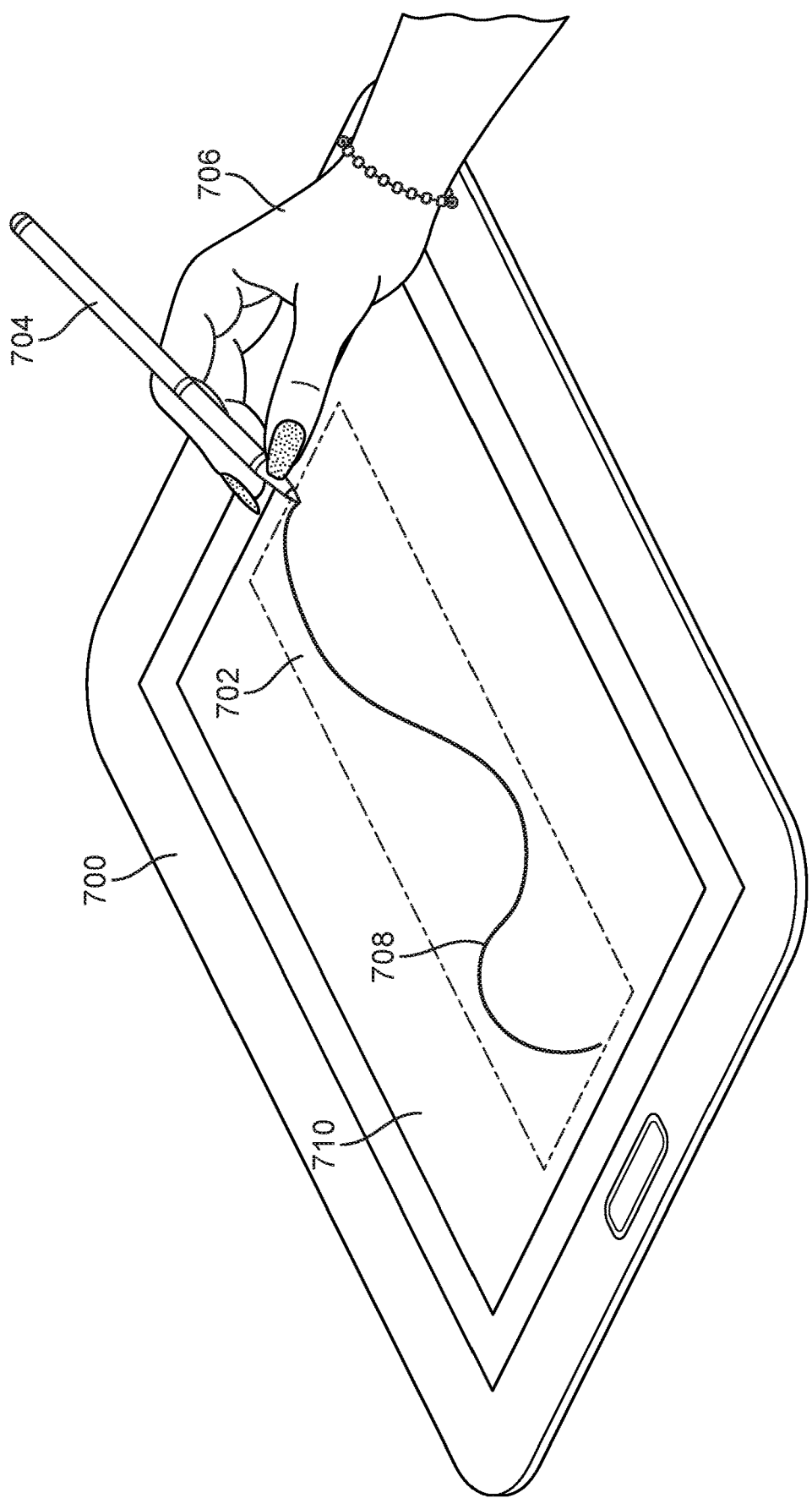
FIG. 7 is a schematic view of an embodiment of a forged signature.

FIG. 7 is a schematic view of an embodiment of forged signature 708. In embodiments, tablet 700 may be configured with similar features as tablet 100 but in a different location or setting. In some situations where a signature is necessary for business, fraudulent actions such as signature forging may occur. In this example, user 706 has no association with the original user 106 meaning user 706 is attempting to provide false identity verification using signature 708.

Figure 8:
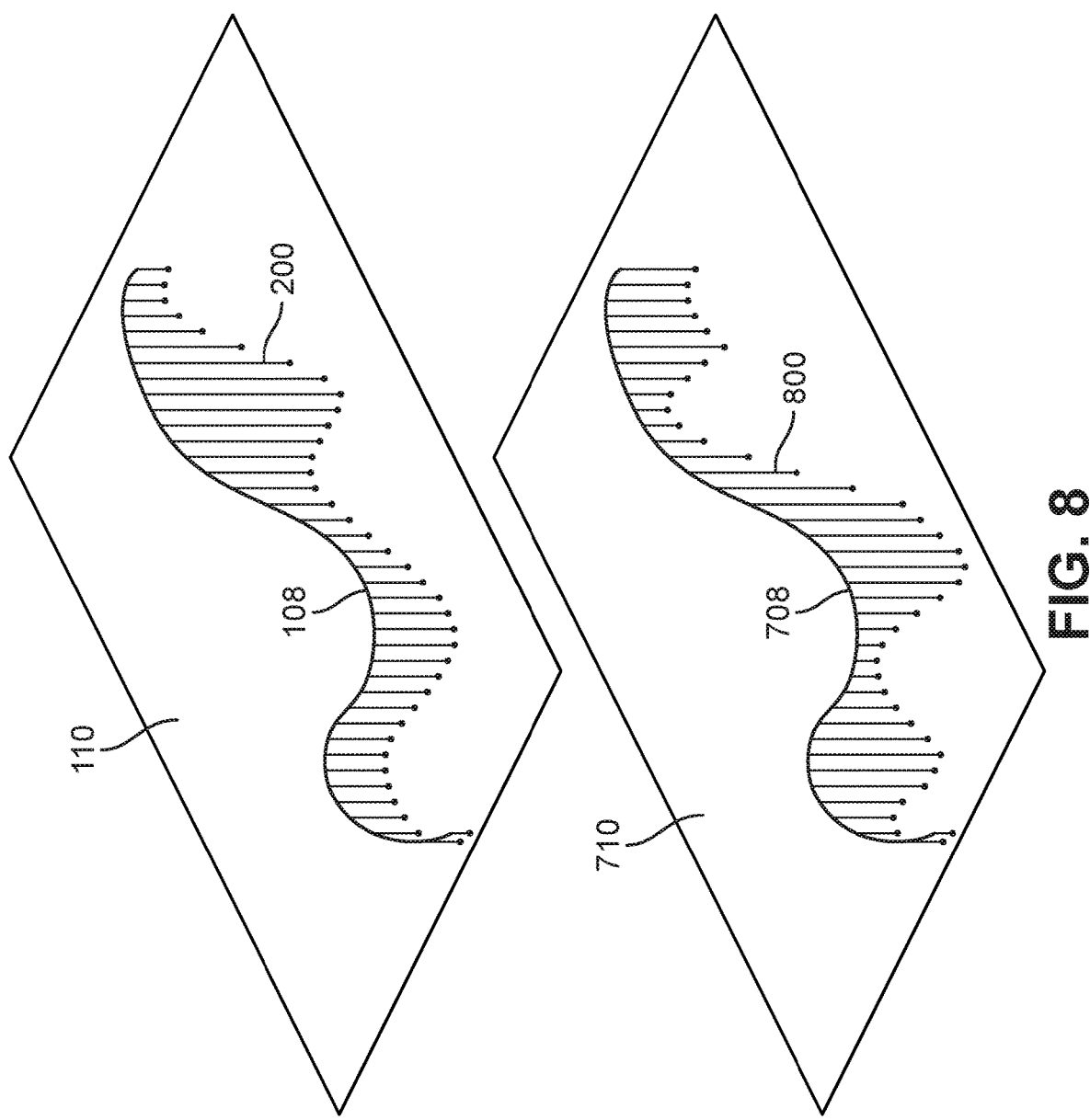
FIG. 8 is a schematic diagram of an embodiment of multiple pressure maps associated with multiple signatures.
Figure 9:
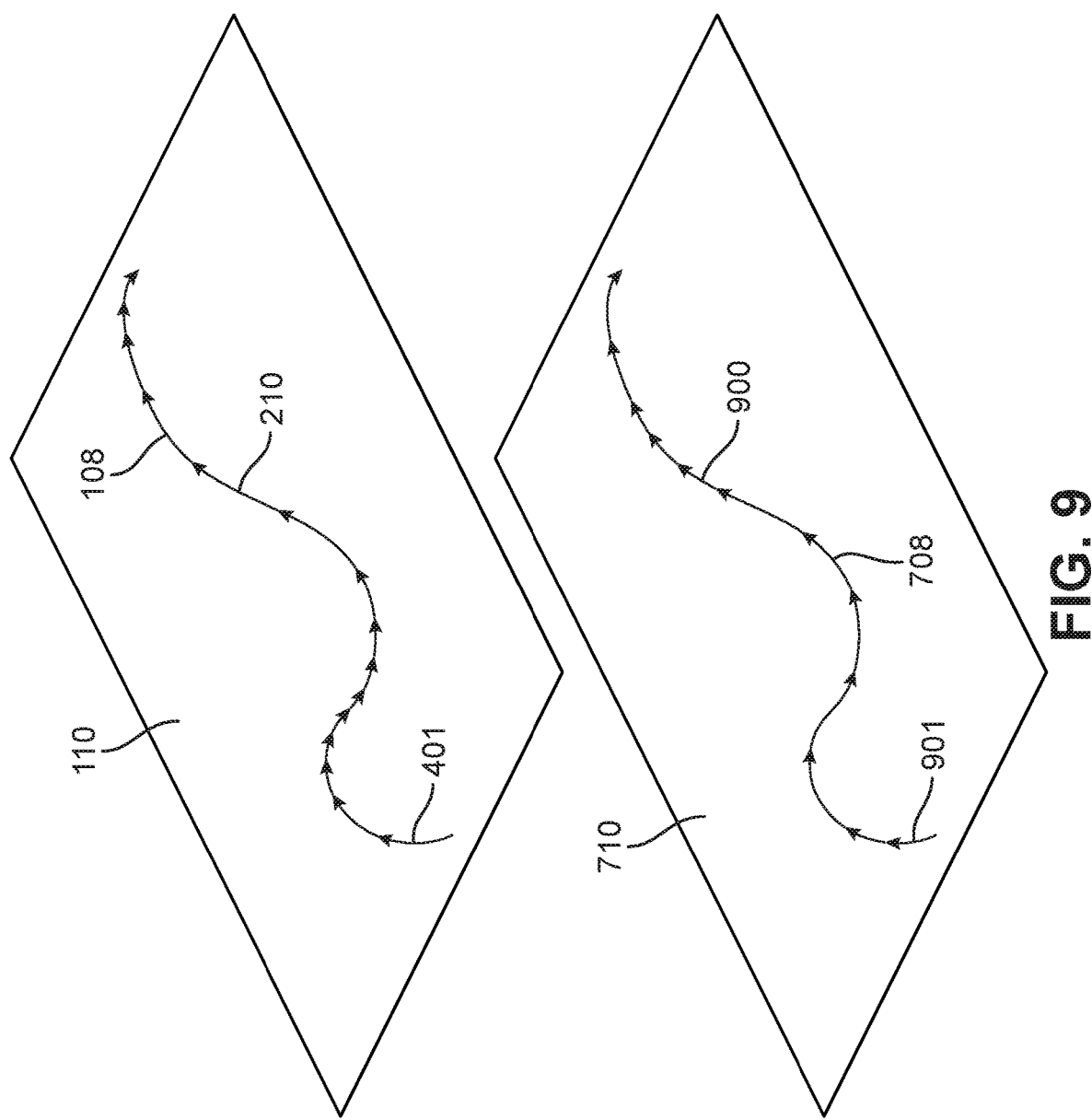
FIG. 9 is a schematic diagram of an embodiment of multiple velocity maps associated with multiple signatures.
Figure 10:
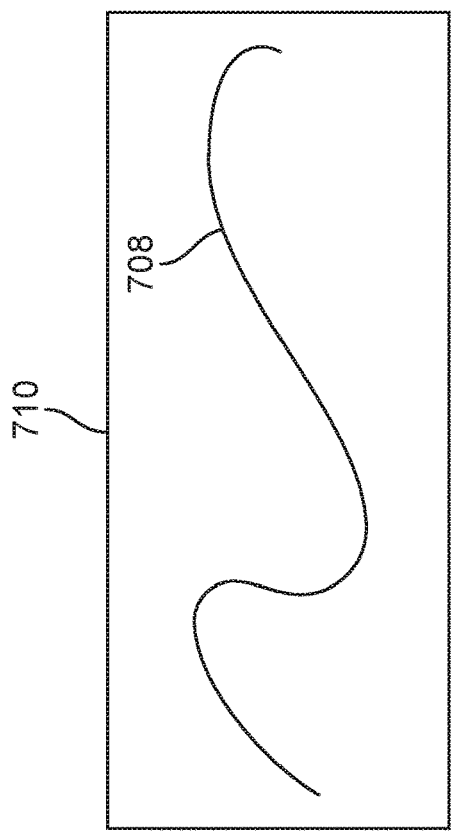
FIG. 10 is a schematic diagram of an embodiment of two signatures that have a similar size.
Figure 10:
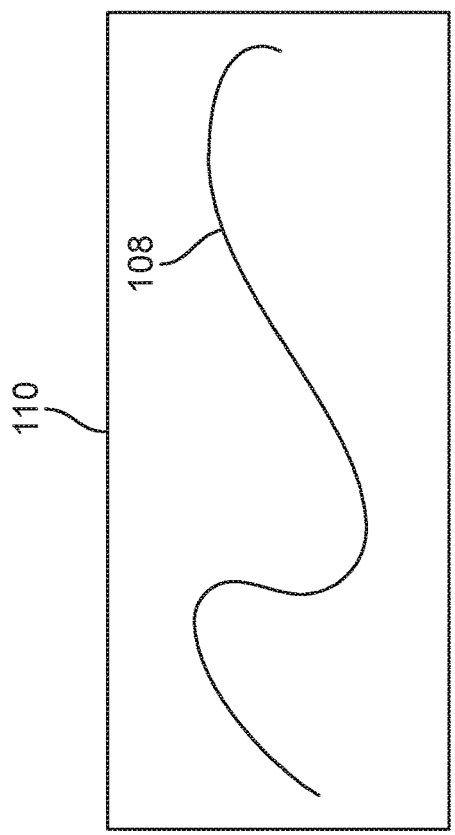

As shown in FIG. 7, user 706 creates forged signature 708 using writing instrument 704 within signing area 702. From initial observation, signature 108 and signature 708 may appear the same. Shown in FIGS. 8, 9 and 10 are schematic diagrams that compare signature 708 to the data associated with user profile 602 and signature 108. Each of the three sub-profiles (pressure profile 604, velocity profile 606 and length and height profile 608) can be used for comparison and validation of a signature.

Although signature 708 and signature 108 appear initially similar, the data information associated with user profile 602 can show differences between both signatures. In one embodiment, pressure profile 604 may show differences in the pressure lines associated with both signatures. As shown in FIG. 8, pressure lines 800 may differ in lengths compared to pressure lines 200. In some embodiments, some pressure lines may be similar in length resulting in similar pressures produced by both users in creation of both signatures. But in the current embodiment shown in FIG. 8, pressure lines 800 differ in length when compared to pressure lines 200 due to user 706 applying different amounts of pressure during production of signature 708.

Additionally, velocity profile 606 may show differences in velocity lines and vector sizes associated with both signatures. As shown in FIG. 9, velocity line 900 is comprised of difference sized vectors across the total length of signature 708. In some embodiments, the total time, speed and velocity of the signature production may be the same when comparing signature 708 with the data associated with user 106 and signature 108.

In some embodiments, individual vectors that make up velocity line 900 may comprise different lengths in comparable positions to vectors of velocity line 210. This can mean that the speed and time it took for user 706 to produce certain portions of signature 708 may not equal the same speed and time it took user 106 to produce signature 108. For example, the initial vector 901 to begin velocity line 900 on display 710 is a different length then the initial vector 401 that begins velocity line 210 on display 110. This can mean that both users started the production of their respective signatures at different speeds across time, showing that forged signature 708 does not match the signature authentication measurement data associated with velocity profile 606.

FIG. 10 depicts a side-by-side comparison of signature 108 and signature 708. As seen in FIG. 10, the two signatures have a substantially identical appearance in terms of their sizes and shapes. Conventional signature authentication techniques that look only at differences in the final signatures, rather than how they are produced (in terms of pressure used and/or stroke velocity) may fail to detect the forged signature 708.

Figure 11:
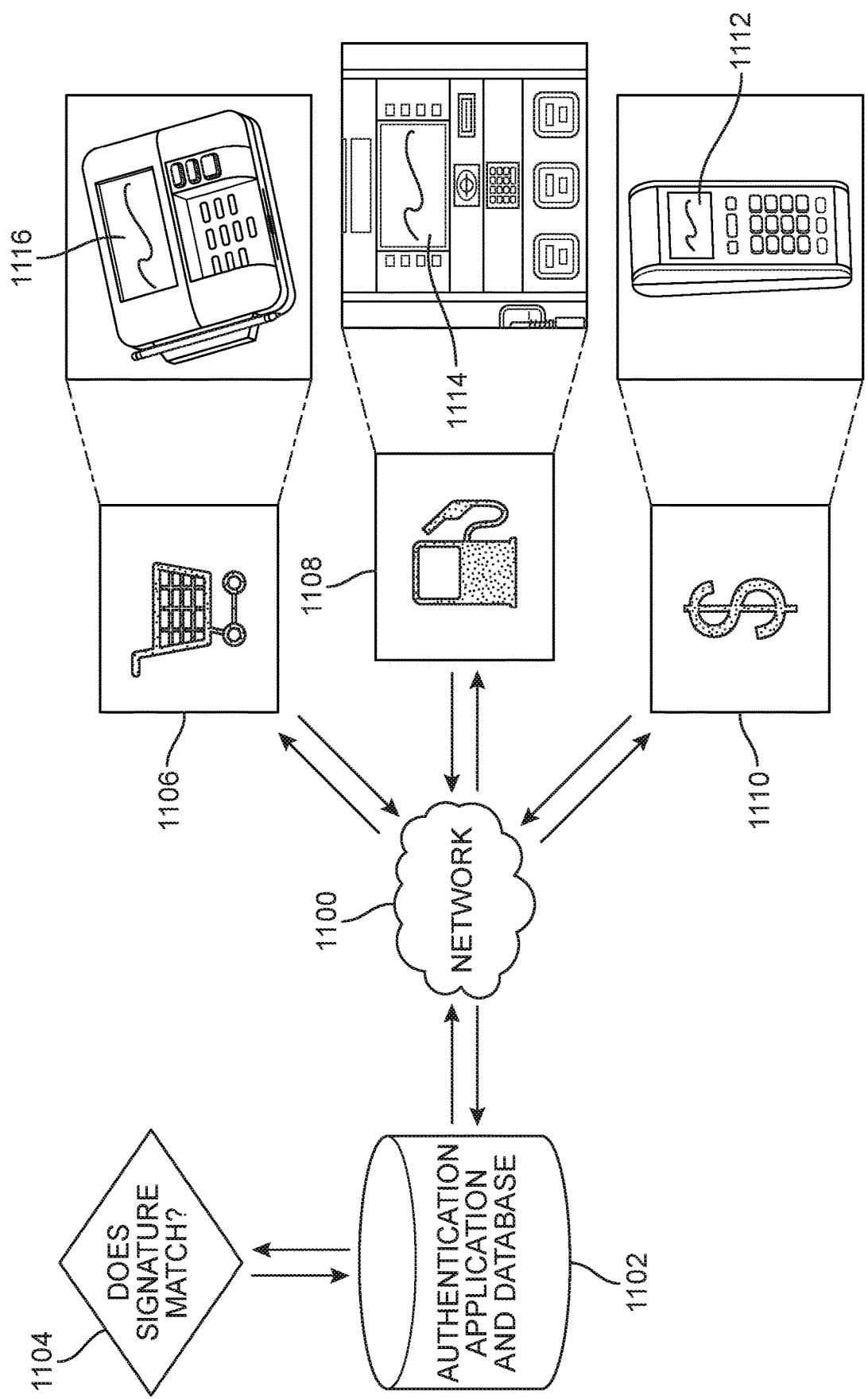
FIG. 11 is a schematic diagram of a system for performing the process of signature authentication, according to the embodiment.

FIG. 11 is a schematic diagram of a system for performing the process of signature authentication, according to the embodiment. The system shown in FIG. 11 is associated with tablet 100 and server 600. Tablet 100 may represent various devices in various environments such as credit card reader 1116, fuel payment device 1114, and bank scanner 1112. All exemplary devices may be included in situations that require electronic signature validation and authentication. An example may include providing an electronic signature after a purchase of fuel at a gas station 1108 or a purchase of various goods at department store 1106. Another example may include transactions at bank 1110 that conclude with identification verification using an electronic signature.

In embodiments, tablet 100 and the devices mentioned in the examples above may send and receive information over one or more networks. As an example, tablet 100 is indicated as communicating over a network 1100 in FIG. 11. In some embodiments, network 1100 may be a wide area network ("WAN"), e.g., the Internet. In other embodiments, network 1100 may be a local area network ("LAN"). For example, in a more remote location far from a metropolitan area, the Internet may not be available. In yet other embodiments, network 1100 may be a combination of a WAN and a LAN. Depending on the type of network, a suitable communications component may be used.

In some embodiments, the system represented in FIG. 11 can allow signature verification and authentication through communication to an authentication application and database 1102 that includes data associated with user profile 602. As an example, an electronic signature may be submitted through credit card reader 1116 at department store 1106. Credit card reader 1116 can transmit and communicate the electronic signature to authentication database 1102 through network 1100. An application and database 1102 can be configured to analyze and compare the transmitted signature for similar or matching data that corresponds with the data associated with user profile 602. The application can make a comparison 1104 to determine if the signatures match. The application can transmit approval or denial of signature verification and authentication to the location and devices where the electronic signature originated. In some embodiments, business transactions or purchases may not be finalized or may be cancelled due non achievement of signature verification from database 1102. In embodiments, the standard of approval may include the transmitted signature data matching all data to a predetermined degree of consistency across the data profiles of user profile 602.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A method of authenticating a recorded signature, comprising:

recording, at a device, recorded pressure information and recorded velocity information for the recorded signature as the recorded signature is created on a display of the device;

detecting a type of an instrument used to create the recorded signature;

retrieving stored pressure information and stored velocity information associated with an authenticated signature, the stored pressure information and the stored velocity information including stored pressure information and stored velocity information associated with using a stylus to create the authenticated signature when the type of the instrument is the stylus and stored pressure information and stored velocity information associated with using a finger to create the authenticated signature when the type of instrument is the finger; and comparing the recorded pressure information for the recorded signature with the stored pressure information and comparing the recorded velocity information for the recorded signature with the stored velocity information to determine if the recorded signature is authentic;

wherein, prior to the comparing, the recorded pressure information and the stored pressure information are unitized to allow for a first comparison of signatures of different sizes by comparing changes in pressure based on dimensionless distances;

wherein, prior to the comparing, the recorded velocity information and the stored velocity information are unitized to allow for a second comparison of the signatures of different sizes by comparing changes in a unitized distance over a fixed duration of time;

wherein the comparing uses information about a range of signature characteristics corresponding to a variety of different situations corresponding to device placement and orientation to account for differences in the recorded signature in the variety of different situations.

2. The method according to claim 1, wherein the recorded pressure information is comprised of a sequence of recorded pressure values at various locations along the recorded signature.

3. The method according to claim 2, wherein the stored pressure information is comprised of a sequence of stored pressure values at various locations along the authenticated signature.

4. The method according to claim 3, wherein comparing the recorded pressure information with the stored pressure information comprises comparing the sequence of recorded pressure values with the sequence of stored pressure values.

5. The method according to claim 1, further comprising determining a handedness associated with the recorded signature by sensing at least one of an angle of pressure and a starting point of the recorded signature.

6. The method according to claim 1, wherein the recorded signature is determined to be inauthentic when at least one of the recorded pressure information being substantially different from the stored pressure information and the recorded velocity information being substantially different from the stored velocity information is true.

7. A method of authenticating a recorded signature, comprising:
   recording, at a device, recorded pressure information and recorded velocity information for the recorded signature as the recorded signature is created on a display of the device;
   detecting a type of an instrument used to create the recorded signature;
   retrieving stored pressure information and stored velocity information associated with an authenticated signature, the stored pressure information and the stored velocity information including stored pressure information and stored velocity information associated with using a stylus to create the authenticated signature when the type of the instrument is the stylus and stored pressure information and stored velocity information associated with using a finger to create the authenticated signature when the type of instrument is the finger; and
   comparing the recorded pressure information for the recorded signature with the stored pressure information and comparing the recorded velocity information for the recorded signature with the stored velocity information to determine if the recorded signature is authentic;
   wherein, prior to the comparing, the recorded velocity information and the stored velocity information are unitized to allow for a comparison of signatures of different sizes by comparing changes in a unitized distance over a fixed duration of time;
   wherein the comparing uses information about a range of signature characteristics corresponding to a variety of different situations corresponding to device placement and orientation to account for differences in the recorded signature in the variety of different situations; and
   determining a handedness associated with the recorded signature by sensing at least one of an angle of pressure and a starting point of the recorded signature.

8. The method according to claim 7, wherein the recorded velocity information is comprised of a sequence of recorded velocity values at various locations along the recorded signature.

9. The method according to claim 8, wherein the stored velocity information is comprised of a sequence of stored velocity values at various locations along the authenticated signature.

10. The method according to claim 9, wherein comparing the recorded velocity information with the stored velocity information comprises comparing the sequence of recorded velocity values with the sequence of stored velocity values.

11. The method according to claim 7, wherein the recorded pressure information is comprised of a sequence of recorded pressure values at various locations along the recorded signature.

12. The method according to claim 7, wherein the recorded signature is determined to be inauthentic when the recorded velocity information is substantially different from the stored velocity information.

13. The method according to claim 7, wherein the recorded signature is determined to be inauthentic when the recorded pressure information is substantially different from the stored pressure information.

14. A method of authenticating a recorded signature, comprising:
   recording, at a device, recorded pressure information and recorded velocity information for the recorded signature as the recorded signature is created on a display of the device;
   detecting a type of an instrument used to create the recorded signature;
   retrieving stored pressure information and stored velocity information associated with an authenticated signature, the stored pressure information and the stored velocity information including stored pressure information and stored velocity information associated with using a stylus to create the authenticated signature when the type of the instrument is the stylus and stored pressure information and stored velocity information associated with using a finger to create the authenticated signature when the type of instrument is the finger; and
   comparing the recorded pressure information for the recorded signature with the stored pressure information and comparing the recorded velocity information for the recorded signature with the stored velocity information to determine if the recorded signature is authentic;
   wherein, prior to the comparing, the recorded velocity information and the stored velocity information are unitized to allow for a comparison of signatures of different sizes by comparing changes in a unitized distance over a fixed duration of time;
   wherein the comparing uses information about a range of signature characteristics corresponding to a variety of different situations corresponding to device placement and orientation to account for differences in the recorded signature in the variety of different situations.

15. The method according to claim 14, wherein the recorded velocity information is comprised of a sequence of recorded velocity values at various locations along the recorded signature and wherein the recorded pressure information is comprised of a sequence of recorded pressure values at same locations.

16. The method according to claim 14, wherein the stored velocity information is comprised of a sequence of stored velocity values at various locations along the authenticated signature and wherein the stored pressure information is comprised of a sequence of stored pressure values at same locations.

17. The method according to claim 14, wherein the recorded signature is determined to be inauthentic when at least one of the recorded pressure information being substantially different from the stored pressure information and the recorded velocity information being substantially different from the stored velocity information is true.

18. The method according to claim 17, further comprising determining a handedness associated with the recorded signature by sensing at least one of an angle of pressure and a starting point of the recorded signature.

19. The method according to claim 14, wherein comparing the recorded pressure information with the stored pressure information comprises comparing a sequence of recorded pressure values with a sequence of stored pressure values.

20. The method according to claim 14, wherein comparing the recorded velocity information with the stored velocity information comprises comparing a sequence of recorded velocity values with a sequence of stored velocity values.

* * * * *